United States Patent [19]
Eidenschink

[11] Patent Number: 5,160,451
[45] Date of Patent: Nov. 3, 1992

[54] MECHANICAL COMPONENT

[75] Inventor: Rudolf Eidenschink, Bodenheim, Fed. Rep. of Germany

[73] Assignee: Merck Patent Gesellschaft mit Beschrankter Haftung, Darmstadt, Fed. Rep. of Germany

[21] Appl. No.: 434,696

[22] PCT Filed: Feb. 16, 1989

[86] PCT No.: PCT/EP89/00141

§ 371 Date: Oct. 26, 1989

§ 102(e) Date: Oct. 26, 1989

[87] PCT Pub. No.: WO89/08136

PCT Pub. Date: Sep. 8, 1989

[30] Foreign Application Priority Data

Feb. 26, 1988 [DE] Fed. Rep. of Germany ....... 3806055
Mar. 29, 1988 [DE] Fed. Rep. of Germany ....... 3810626
Jun. 29, 1988 [DE] Fed. Rep. of Germany ....... 3821855
Aug. 12, 1988 [DE] Fed. Rep. of Germany ....... 3827351

[51] Int. Cl.⁵ .................. C09K 19/52; C09K 19/00
[52] U.S. Cl. .................. 252/299.01; 428/1; 359/62

[58] Field of Search .......... 252/299.1; 428/1; 359/103, 62

[56] References Cited

U.S. PATENT DOCUMENTS

| | | | |
|---|---|---|---|
| 3,597,043 | 8/1971 | Dreyer | 350/149 |
| 3,876,286 | 4/1975 | Deutscher et al. | 252/299 |
| 4,115,310 | 9/1978 | Sato et al. | 252/299 |
| 4,622,164 | 11/1986 | Eidenschink et al. | 252/299.63 |

FOREIGN PATENT DOCUMENTS 0092682 11/1983 European Pat. Off. .
0199211 10/1986 European Pat. Off. .

Primary Examiner—Robert L. Stoll
Assistant Examiner—Shean C. Wu
Attorney, Agent, or Firm—Millen, White, Zelano and Branigan

[57] ABSTRACT

A mechanical component consisting of solid bodies which are mobile relative to one another under a variable frictional force and are separated from one another by a fluid organic mass, characterized in that the change in frictional force is induced by phase transitions between different thermotropic liquid-crystalline phases or between a thermotropic liquid-crystalline phase and an isotropic phase.

17 Claims, 3 Drawing Sheets

MECHANICAL COMPONENT

BACKGROUND OF THE INVENTION

The invention relates to a mechanical component consisting of solid bodies or parts of bodies, which are mobile relative to one another and are separated from one another by a fluid organic mass, wherein it is possible to vary the frictional forces acting between the bodies by changing the molecular order in the organic mass.

The motion of solid bodies within machines and the motion of a machine relative to a fixed base are, inter alia, determined by the friction which is applicable in each case between the bodies concerned. The fundamental distinction must here be made as to whether the bodies slide on one another or roll on one another. The magnitude of the sliding friction depends on whether the bodies slide directly on one another or are completely separated from one another by a lubricant. This is called dry friction in the first case and hydraulic friction in the second. So-called semi-hydraulic friction occurs if the lubricating film is incompletely formed. Sliding friction also takes place always in rolling bearings between the rolling elements and their guide elements.

As is known, the lubrication processes in machines can be classified in two groups. In hydrodynamic lubrication, the load-bearing capacity in a lubricating film is produced in the form of a gap of relatively large dimensions. The friction is then primarily determined by the temperature dependence of the viscosity of the lubricant. In the case of elasto-hydrodynamic lubrication, a very small lubrication gap is formed from an initially linear or punctiform contact of two elastic bodies. The flattening in the so-called Hertz contact region, together with the increase in the viscosity of the lubricant with pressure, has the result that the solid bodies moving relative to one another hardly touch directly or not at all. In existing practice, very high pressures, in the range of 1 to 40 kbar, are necessary to produce sufficiently high viscosities. By comparison, the pressures applied in hydraulic devices are much too low to enable a substantial change in the viscosity of the hydraulic oil and hence also the motion sequences. The pressure conditions in lubricants and in hydraulic oils have been described (Dubbel, Taschenbuch für den Maschinenbau, [Pocketbook for Machine Engineering], Springer-Verlag, Berlin).

It is elementary to minimize the frictional losses in bearings by selecting a suitable lubricant. A large number of liquid lubricants—these are organic compounds in most cases—are nowadays in use. It is likewise elementary to ensure a high frictional force by selection of the materials, if a clutch effect or braking effect is to be achieved. The possibility, in principle, of changing the function of a mechanical component by varying the viscosity—for instance, changing the function from that of a slide bearing to that of a clutch—is provided by electro-rheology. In this case, the viscosity in layers of colloidal solutions is varied by means of an applied electric field (J. E. Stangroom, Electro-rheological Fluids, Phys. Technol., volume 14, pages 290-296 (1983)).

Some organic compounds do not pass directly from the crystalline phase into the isotropic-liquid phase on heating, but pass through one or more additional phases within clearly defined temperature ranges. These phases have anisotropic physical properties, as are observed in crystals, but are at the same time fluid like ordinary isotropic liquids. The phases formed by molecules of elongate shape are also described as a rod-like or calamitic phase. As distinct from the completely disordered isotropic phase, a long-range order of the orientation applies in this case. In the nematic phases (abbreviated as N) of hitherto known low-molecular compounds, the molecules can freely rotate about their longitudinal axis. Closely related to the nematic phase is the cholesteric phase which is formed by optically active elongate molecules or is obtained by addition of optically active compounds to nematic compounds. For purposes of the present invention, cholesteric phases are included in the term nematic phase. As a result of intermolecular interaction, parallel-aligned rod-like molecules can be assembled into layers and the latter can be arranged in space at always identical spacings. This layer structure is typical of the smectic phases. Different smectic phases can arise which differ by the arrangement of their components within the layers. The centres of gravity of the molecules within one layer can be arranged at random (for example in the $S_A$ phase and the $S_C$ phase) or regularly (for example in the $S_B$ phase). The phases have been designated approximately in the order in which they were discovered. Nowadays, smectic phases $S_A$ to $S_K$ are known. The features of such calamitic phases have been described (for example G. W. Gray, J. W. Goodby, Smectic Liquid Crystals, Leonard Hill, Glasgow (1984)). Liquid-crystalline phases can also be formed by disc-shaped compounds (so-called discoid phases). The discoidnematic phase here has the molecule arrangement which is the easiest to describe. In the so-called discoid-columnar phases, such molecules are combined in column-like arrangements as the result of intermolecular interactions. The features of discoitectic phases have been described, for example, in Mol. Cryst. Liq. Cryst. 106, 121 (1984). More recently, compounds have been disclosed which form so-called phasmidic phases, which are likewise thermotropic liquid-crystalline phases (for example J. Malthete et al., J. Phys. (Paris) Lett., volume 46, 875 (1985)). Thermotropic liquid-crystalline phases are also formed by polymers and their mixtures with low-molecular compounds (for example H. Finkelmann in Thermotropic Liquid Crystals, John Wiley & Sons, New York (1987) pages 145-170). The exploitation of the favourable viscosity within a single thermotropic liquid-crystalline phase for clock movements has already been described (European Patent 0,092,389).

It is known that the transitions between the Liquid-crystalline phases are pressure-dependent (for example G. M. Schneider et al., Physica 139 & 140 B, 616, (1986)). The dependence of the transition temperatures between the various phases are subject to the known Clausius-Clapeyron rules. In general, the existence ranges of the liquid-crystalline phases are shifted to higher temperatures by an increase in pressure. The order of the appearance of the phases remains unchanged in most cases, but it is possible that an additional pressure-induced phase arises. Thus, the transition temperatures of, for example the compound

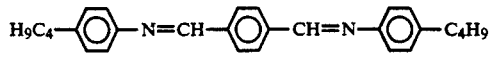

for normal pressure are $S_F$-$S_C$ 160° C., $S_C$-$S_A$ 195° C., $S_A$-I 204° C., for 250 bar $S_F$-$S_C$ 171° C., $S_C$-$S_A$ 204° C., $S_A$-N 206° C. and N-I 208° C. It is also known that the intermolecular interactions which determine the viscosity change during such transitions.

The term phase transition includes, within the meaning of the mechanical component according to the invention, so-called pretransitional phenomena (described in: G. Vertogen, W. H. de Jeu, Thermotropic Liquid Crystals, Fundamentals, Springer-Verlag, Berlin 1988). These are changes in the molecular order and hence physical properties in the event of changes in pressure or temperature even before the phase transition is reached, for instance in the case of a pressure increase before the transition from nematic to $S_B$ is reached. The invention thus also comprises a mechanical component which changes its frictional force as a result of an induced change in the temperature or pressure in a fluid organic mass, if this mass has at least one enantiotropic thermotropic liquid-crystalline phase. In particular, it comprises such a component which is operated at temperatures which are 0.1°–30° C. above an enantiotropic transition from a liquid-crystalline phase into another liquid-crystalline phase or from the isotropic phase into a liquid-crystalline phase.

It is a requirement of the component according to the invention that a temperature or pressure difference is induced. The existence ranges of the phases concerned depend, in addition to the pressure, also on the temperature, so that changes in temperature during operation must be allowed for.

Conventional lubricants change their viscosity as a function of the temperature or pressure to such a small extent that very large temperature differences or pressures are required in order to obtain a favourable change in the frictional properties. For this reason, the applicability of this dependence to mechanical components—such as rolling bearings, rolling couplings and toothed gearings—with relatively small contact areas is limited in the case of high contact pressures and a high elasticity of the materials of the solid bodies concerned. Moreover, it has hitherto not been possible to use the electro-rheological liquids, because they tend to undergo sedimentation. In addition, the moving machine parts are subject to wear. In general, it is not easy to accomplish high electric field strengths between mobile, electrically conductive machine parts.

SUMMARY OF THE INVENTION

It is the object of the invention to make it possible in a simple manner, to change the frictional force acting between two solid bodies moving relative to one another.

According to the invention, the object is achieved by introducing a thermotropic liquid-crystalline mass, or a mass capable of forming one or more thermotropic liquid-crystalline phases, between the bodies of a mechanical component, which are mobile relative to one another, and inducing a phase transition between different thermotropic liquid-crystalline phases or between a thermotropic liquid-crystalline phase and the isotropic phase (abbreviated as I) by changing the temperature conditions or pressure conditions within this mass. The object is made more difficult by the fact that the frictional forces, which are established in a complicated manner in flowing, anisotropic media, cannot be precalculated and that it is impossible to state which of the numerous viscosity coefficients of the particular phases concerned are decisive for this effect.

DETAILED DESCRIPTION OF THE PREFERRED EMBODIMENTS

Figure 1:
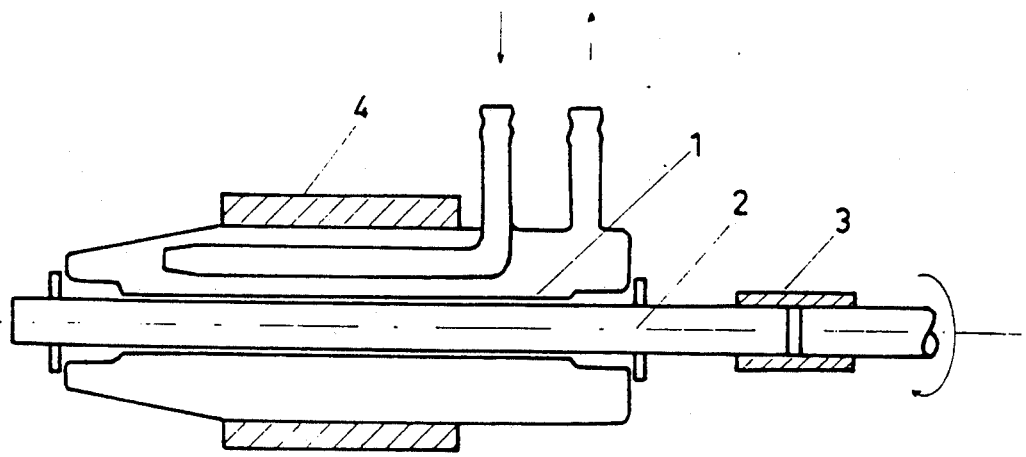
FIG. 1 is a schematic representation of a mechanical component of this invention which can function as a slide bearing.

It has been found, surprisingly, that devices according to the invention can be realized by means of compounds or mixtures of compounds having a phase transition from an isotropic phase to a smectic phase, or from a discoid-columnar phase to a discoid-nematic phase. The I-$S_B$, I-$S_A$, I-$S_C$ and I-$S_E$ transitions are preferred here. The transition I-$S_B$ is particularly preferred.

It has also been found that devices according to the invention can be realized by means of compounds and mixtures of compounds having a phase transition from the nematic phase into a smectic phase. N-$S_B$ and N-$S_A$ phase transitions are preferred. Compounds or mixtures having an N-$S_B$ phase transition are particularly preferred.

It has been found, surprisingly, that devices according to the invention can be prepared by means of compounds or mixtures of compounds having phase transitions between smectic phases of different order. The $S_B$-$S_A$ and $S_C$-$S_A$ transitions are preferred. The $S_B$-$S_A$ phase transition is particularly preferred.

The present invention also includes components which exploit the multi-step change in the frictional force, when the fluid layer passes successively through a plurality of phase transitions with rising or falling temperature or rising or falling pressure. By the choice of the compounds used and the selection of their proportions in mixtures, the phase sequence and the temperature intervals or pressure intervals of the phases can be adjusted within wide ranges. Preferred phase sequences with rising pressure are N-$S_A$-$S_B$, I-$S_A$-$S_B$, N-$S_C$-$S_B$, I-$S_C$-$S_B$, I-$S_A$-$S_C$-$S_B$, N-$S_A$-$S_C$-$S_B$ and, N-$S_A$-$S_C$-$S_G$.

It has also been found that devices according to the invention can be produced, if the organic masses (sic) located between two bodies mobile relative to one another consists of compounds or mixtures of compounds which have a phase transition from an isotropic phase or discoidnematic phase to a discoid-columnar phase. In this case, compounds or mixtures with transitions from an isotropic phase to a discoid-columnar phase are preferred.

The present invention also includes devices whose fluid organic masses consist of compounds or mixtures of compounds which form so-called calamitic or discoid reentrant phases, that is to say which pass, for example, through the phase sequence N-$S_A$-N or N-$S_A$-I with a rise in temperature or pressure, the range of existence of, for example, the $S_A$- phase being located above the pressure interval of a nematic phase. The existence of such liquid crystals has been described (for example, L. Longa, and W. H. de Jeu, Phys. Rev. A26 1632 (1982)).

It has also been found that mechanical components according to the invention can be produced by means of compounds of the formula I $$R^1-A-(Z^1A^1)_l-(Z^2A^2)_m-(Z^3A^3)_n-R^2$$

wherein $R^1$ and $R^2$ each are an unsubstituted or substituted alkyl group having 1 to 18 C atoms, in which one or two adjacent $CH_2$ groups can also be replaced by $-O-$, $-CO-$, $-CHOH-$, $-CHCN-$, $-OOC-$, $-COO-$, $-CH=CH-$ and/or $-C\equiv C-$, a perfluoroalkyl group having 1 to 12 C atoms, in which one or two CF groups can also be replaced by $-O-$, $-CHF-$, $-CH_2-$ and/or $-CHOH-$ and/or one $CF_3$ group can be replaced by $CF_2H$ or $-CH_2OH$, and $R^2$ can also be H, F, Cl, $-CN$ or $-COOH$, A, $A^1$, $A^2$, $A^3$ are each 1,4-phenylene which is unsubstituted or mono- to di-substituted by CN groups or F or Cl atoms and in which one or two CH groups can also be replaced by N atoms, 1,4-cyclohexylene in which one or two $CH_2$ groups can also be replaced by an O atom or CHF or $CF_2$ groups, and 1,4-bicyclo[2.2.2]octylene, $Z^1$, $Z^2$, $Z^3$ are each $-CH_2CH_2-$, $-CH_2O-$, $-OCH_2$, $-COO-$, $-OOC-$, $-CH_2CF_2-$, $-CF_2CF_2-$, $-CH=N-$, $-CH=CH-$, $-C\equiv C-$ or the single bond and l, m, n are each 0 or 1, and also by means of mixtures of compounds of the formula I or mixtures which predominantly consist of compounds of the formula I.

The meaning of the symbols $R^1$, $R^2$, A, $A^1$, $A^2$, $A^3$, $Z^1$, $Z^2$, m and n is as indicated above. The cyclic structural elements A, $A^1$, $A^2$ and $A^3$ in the formula I are simplified as follows: PE represents a 1,4-phenylene group, CY represents a 1,4-cyclohexylene group and BO represents a 1,4-bicyclo[2.2.2.]octylene group.

The compounds of the formula I thus comprise compounds of the part formulae Ia, Ib, Ic and Id $$R^1-A-R^2 \qquad \text{Ia}$$

$$R^1-A-Z^1-A^1-R^2 \qquad \text{Ib}$$

$$R^1-A-Z^1-A^1-Z^2-A^2-R^2 \qquad \text{Ic}$$

$$R^1-A-Z^1-A^1-Z^2-A^2-Z^3-A^3-R^2 \qquad \text{Id}$$

Compounds of the formula Ib are particularly preferred. The groups $Z^1$ and $Z^2$ in the formulae Ib to Id are preferably single bonds or $-CH_2CH_2-$.

The compounds of the formula Ia comprise the preferred part formulae Iaα and Iaβ:

$$R^1-PE-R^2 \qquad \text{Iaα}$$

$$R^1-CY-R^2 \qquad \text{Iaβ}$$

Formula Ib comprises the preferred part formulae Ibα and Ibγ:

$$R^1-PE-Z^1-PE-R^2 \qquad \text{Ibα}$$

$$R^1-CY-Z^1-CY-R^2 \qquad \text{Ibβ}$$

$$R^1BO-Z^1-BO-R^2 \qquad \text{Ibγ}$$

Among these, the compounds of the part formula Ibβ are particularly preferred.

The compounds of the formula Ic comprise those of the preferred part formulae Icα to Icð

$$R^1-CY-Z^1-PE-Z^2-PE-R^2 \qquad \text{Icα}$$

$$R^1-PE-Z^1-CY-Z^2-PE-R^2 \qquad \text{Icβ}$$

$$R^1-CY-Z^1-PE-Z^2-CY-R^2 \qquad \text{Icγ}$$

$$R^1-PE-Z^1-PE-Z^2-PE-R^2 \qquad \text{Icδ}$$

$$R^1-CY-Z^1-CY-Z^2-PE-R^2 \qquad \text{Icε}$$

$$R^1-CY-Z^1-CY-Z^2-CY-R^2 \qquad \text{Icð}.$$

Amongst these, the compounds of the part formulae Icα, Icβ and Icγ are particularly preferred.

The compounds of the formula Id comprise the preferred part formulae Idα to Iδ:

$$R^1-PE-Z^1-PE-Z^2-PE-Z^3-PE-R^2 \qquad \text{Idα}$$

$$R^1-CY-Z^1-PE-Z^2-PE-Z^3-PE-R^2 \qquad \text{Idβ}$$

$$R^1-CY-Z^1-PE-Z^2-PE-Z^3-CY-R^2 \qquad \text{Idγ}$$

$$R^1-CY-Z^1-CY-Z^2-CY-Z^3-CY-R^2 \qquad \text{Idδ}.$$

Amongst these, the compounds of the part formula Idβ are particularly preferred.

The radicals $R^1$ and $R^2$ are preferably alkyl and alkoxy and, in addition, the carbonitrile group the carboxylic acid group are preferred for $R^2$.

A, $A^1$, $A^2$ and $A^3$ are preferably CY, PE or BO. The alkyl radicals in the radicals $R^1$ and $R^2$ can be unbranched or branched. Preferably, they are unbranched and are methyl, ethyl, propyl, butyl, pentyl, hexyl, heptyl, oxtyl, nonyl, decyl, undecyl, dodecyl, tridecyl, tetradecyl, pentadecyl, hexadecyl, heptadecyl or octadecyl.

Some of the compounds of the formula 1 are known and some are still novel. They are prepared by generally known methods or analagously to these methods. They can be found, for example, in the Houben-Weyl series, Methoden der Organischen Chemie, [Methods of Organic Chemistry], Georg-Thieme-Verlag, Stuttgart.

Compounds of the formula I can contain one or more asymmetric C atoms. In this case, the formula I also comprises enantiomer mixtures and racemates in addition to optically active enantiomers.

It has also been found that a mechanical component with variable frictional force can be produced by introducing, between the mobile bodies, a mass which contains at least one compound of the formula II

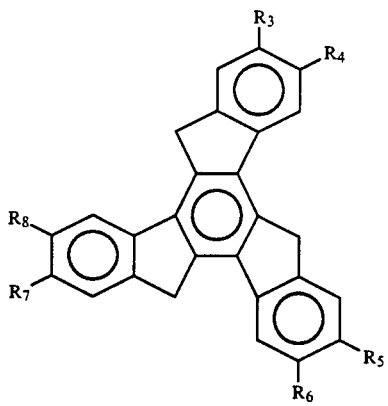

II wherein

R$_3$ to R$_8$ independently of one another are H, F, Cl or a substituted or unsubstituted alkyl group having 1 to 18 C atoms, in which one or two non-adjacent CH$_2$ groups can also be replaced by —O—, —CO—, —COO— or —CF$_2$—.

The radicals R$_3$ to R$_8$ in the formula II are preferably alkanoyloxy, alkoxy or alkyl.

An advantageous route to the truxene derivatives of the formula II leads via suitable indan-1-ones (C. R. Acad. Sci. Ser. C, 287, 545 (1978)). Some of the compounds of the formula II have not yet been described. They are prepared by this synthetic route and, in other respects, generally known methods. These can be found, for example, in the Houben-Weyl series Methoden der Organischen Chemie, [Method of Organic Chemistry], Georg-Thieme-Verlag, Stuttgart.

The compounds of the formulae I and II, which are stable per se, can contain up to 1% by weight of an antioxidant, such as hydroquinone or 2,6-di-tert.-butyl-4-methylphenol, in order to retard autooxidation reactions which take place in mechanical components operated at high temperatures with access of air.

The compounds of the formula I or II are used as individual substances or as mixtures of compounds of the formulae I and II.

Suitable mixtures contain 2 to 10, preferably 2 to 5, compounds of the formula I and/or II. Suitable mixtures can also contain further components in addition to one or more compounds of the formula I or II. Such mixtures contain 5 to 99.9% by weight, preferably 30 to 95% by weight, of one or more compounds of the formula I or II. The additional components of such mixtures can be cyclic and acyclic hydrocarbons, which contain one to five identical or different radicals from the group comprising

—OH,

—F,

—Cl,

—CN, or are unsubstituted, liquid-crystalline main chain polymers or side chain polymers, or the above-mentioned antioxidants.

Compounds are preferred which form enantiotropically or monotropically discotic phases. These include hexa-substituted derivatives of benzene, hexa-substituted derivatives of triphenylene, hexa-substituted derivatives of cyclohexene and phthalocyanine derivatives.

The use of compounds of the formula I or II and mixtures thereof in the machine component according to the invention is favoured by the fact that the transitions between different liquid-crystalline phases as well as between liquid-crystalline phases and the isotropic phase takes place with only slight delays in time. Metastable phases due to subcooling, such as arise in the transition from the liquid phase to the crystalline phase of non-mesomorphous compounds, can thus be excluded if the arrangement is operated above the crystallization temperature. This temperature can be adjusted to a sufficiently low level by the use of eutectic or non-eutectic mixtures of compounds having a liquid-crystalline phase. A further favourable aspect is that only low enthalpies of transition, as compared with the enthalpies of fusion, apply to the isotropic/liquid-crystalline or liquid-crystalline/ liquid-crystalline phase transitions.

The choice of heat supply or heat removal depends on the function of the device according to the invention within a machine. The transfer of heat energy from the surface of the metallic or non-metallic bodies, mobile relative to one another, to the fluid layer can take place by convection by means of a liquid or a gas. Heat supply is also possible by electric resistance heating, by electromagnetic waves if at least one of the bodies, mobile relative to one another, is transparent, or by an alternating electric field between two electrically conductive bodies. The removal of heat energy from the fluid layer can be effected by a cooling liquid or a gas. Removal by heat radiation alone is also possible. Furthermore, heat energy can be removed in special cases by means of Peltier elements.

If sufficient frictional heat is generated in the layer, which is below the particular transformation temperature, and poor heat removal is ensured at the same time, the phase transformation takes place without heating.

The frictional forces which arise in the liquid-crystalline mass of a machine component according to the invention depend on the alignment of the molecules relative to the direction of motion of the solid bodies of the component. It is possible to influence this alignment by pretreating the body surfaces by rubbing in a preferential direction or by applying a thin layer of an organic or inorganic material.

The machine component according to the invention can be used as a clutch, as a brake, as a mechanical overload preventer, as a hydraulic damping element or as an element for hydraulic force transmission (the two latter machine components can be combined under the term hydraulic device). The use as a slide bearing with a dependence, adjustable for the intended application, of the frictional loss on the temperature is also possible. This is of particular advantage with a view to saving mechanical energy because, at low rotational frequencies in a radial bearing or thrust bearing, a high effective viscosity and hence a low rotational transition frequency $n_u$ from semi-fluid friction to fluid friction can be selected. When the rotational frequency is increased, the temperature can be raised by the frictional heat alone or by additional supply of heat energy to such an extent that a transition to a phase of lower effective viscosity takes place. The relationships between frictional loss, viscosity and $n_u$ are known (R. Stribeck, VDI-Zeitschr. volume 46, page 1341 (1902)).

In a machine component according to the invention, a braking action can be achieved by a drastic increase in viscosity—for example in the case of a phase transition from nematic to $S_B$—when the static pressure in the lubrication gap of a slide bearing or of two metal discs mobile relative to one another, is increased. In this case, the static pressure in the organic mass can be varied from the outside by means of an additional hydraulic piston. A prerequisite is sufficient sealing of the space taken up by the organic mass. The braking performance of such a component is additionally determined by the heat removal from the lubrication gap.

The use of the mechanical component according to the invention as a clutch can be realized in the same way.

The invention includes a mechanical component in which motion sequences are additionally determined by the pressure dependence of the viscoity of the medium which is to be transported. In this case, the use of an organic medium with one or more pressure-dependent transitions between liquid-crystalline phases or between a liquid-crystalline phase and the isotropic liquid phase allows a hydraulic damper to be produced which can absorb loads from widely different ranges of orders of magnitude, in which case different damping constants have to be applied depending on the phase relationship. The temperature due to the compression work on the fluid organic mass is of subordinate importance in practice.

A mechanical component according to the invention allows wear to be reduced in the frictional transmission of forces. In this case, the fact is exploited that, even at relatively small contact pressures, an increase in viscosity and hence a transition from mixed friction to fluid friction takes place, if a phase transition from nematic or isotropic to $S_B$ or $S_E$ occurs as a result of an increase in pressure. The use of compounds of the formula I and mixtures thereof in the mechanical component according to the invention represents an improvement of gearboxes which use so-called traction fluids (compare O. Dittrich, VDI-Berichte 680, pages 201-219 (1988)).

The compounds of the formula I or II and mixtures thereof show excellent wetting of metal surfaces and ceramic surfaces.

A mechanical component according to the invention can be used as a Visko clutch (W. Peschke, SAE Technical Paper Series, No. 860 386, Detroit (1986)) if, as a result of an increase in pressure during engagement of the clutch, in spite of the resulting increase in temperature, an increase in viscosity or even only a small increase in viscosity occurs as compared with the declutched state. The disadvantages resulting from the use of the poorly wetting silicone oils can also be avoided in this way.

The present invention makes it possible, in an advantageous manner, to induce a change in the frictional force acting between two solid bodies moving relative to one another. A machine component according to the invention is distinguished by a structure which is particularly simple and not susceptible to faults, and does not require any colloidal solutions which promote wear. Moreover, a considerable saving in energy can be achieved thereby. The compound of the formula I or II and the mixtures prepared from them are outstandingly suitable for this purpose, because of their stability and the scope for using the compounds for adjusting suitable phase transitions within fairly wide temperature ranges.

The examples which follow are intended to explain the invention without limiting it. The friction moment (friction force × lever arm) is that torque in N×m which must be applied in order to maintain an existing rotational movement. It is determined by a measurement of the energy dissipation in a manner known to those skilled in the art.

EXAMPLE 1

A mechanical component (FIG. 1), the function of which can selectively be that of a slide bearing or that of an effective brake, consists of a sheathed and temperature-controllable Duran glass sleeve (1) with a ground joint and of a shaft (2) guided for a length of 70 mm and having a diameter of 10 mm, likewise of Duran glass (produced by Schott Glaswerke, Mainz). The shaft is connected via a piece of thick-walled rubber hose (3) to a drive unit (not shown in FIG. 1) which is fitted with a measuring device which allows the energy dissipation, attributable to the machine component, to be measured as a function of the rotational frequency of the shaft. (4) is a retaining device. Before starting, the separate ground joint elements are heated with hot air and coated with a sufficient quantity of

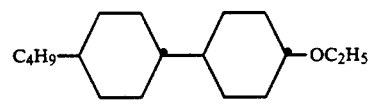

trans, trans-4-ethoxy-4'-butyl-bicyclohexyl
(transition from $S_B$ to isotropic at 51° C.)

so that, on assembly, a film free of air bubbles is formed on the entire friction surface. Paraffin at a temperature of 56° C. is passed through the shell and the shaft is rotated at 1 Hz. The fraction moment of the sliding device is found to be $4 \times 10^{-4}$ N×m. Paraffin oil at a temperature of 44° C. is then fed in at a flow velocity of 5 ml×s$^{-1}$. After 30 seconds, a friction moment of $2 \times 10^{-1}$ N×m is measured. After the oil temperature has been raised to 56° C., the original value of the friction moment is re-established. The following are used analagously (the temperatures are stated in degrees C., through which the system must pass for a change in the friction moment):

| | |
|---|---|
| trans,trans-4-methoxy-4'-pentyl-bicyclohexyl | 29 |
| trans,trans-4,4'-dipentyl-bicyclohexyl | 110 |
| trans,trans-4-(2-cyanoethyl-4'-pentyl-bicyclohexyl | 30/109 |
| trans,trans-4-(2-cyanobutyl)-4'-pentyl-bicyclohexyl | 80 |
| 4,4'-dipentyl-biphenyl | 52 |
| 4-heptyl-4'-propyl-biphenyl | 51 |
| 4-hexyl-4'-hexyloxy-biphenyl | 68/84 |
| 4'-octyloxy-biphenyl-4-carboxylic acid ethylester | 88/96/112 |
| 4-pentyl-4'-(propynyl)-1-biphenyl | 83 |
| 4'-decyl-biphenyl-4-carboxylic acid | 247 |
| 1,2-bis[trans-4-pentylcyclohexyl]ethane | 109 |
| 1,2-bis[trans-4-ethylcyclohexyl]ethane | 29 |

-continued

| | |
|---|---|
| C₂H₅—[bicyclo]—C₂H₅ | |
| 4,4'-diethyl-bicyclo[2.2.2]octane | 209 |
| C₅H₁₁—[cyclohexyl]—[phenyl]—CH₂CH₂OH | |
| 4-trans-(4-pentylcyclohexyl)-2-hydroxyethyl-benzene | 59/73 |
| CF₃O—[phenyl]—COO—[phenyl]—C₆H₁₃ | |
| 4-hexylphenyl 4-trifluoromethoxbenzoate | 110 |
| 4-heptadecafluoro-octylphenyl 4-cyanophenyl-benzoate | 145 |
| C₄H₉—[phenyl]—[cyclohexyl]—C₄H₉ | |
| 1,2-bis[4-butylphenyl]cyclohexane | 107 |
| 1,2-bis[4-dodecylphenyl]cyclohexane | 109 |
| C₅H₁₁—[phenyl]—OCH₂—[cyclohexyl]—CH₂O—[phenyl]—C₅H₁₁ | |
| trans-1,4-bis[4-pentylphenoxymethyl]cyclohexane | |
| C₅H₁₁—[cyclohexyl]—[phenyl]—[phenyl]—[cyclohexyl]—C₅H₁₁ | |
| 4,4'-bis[trans-4-pentylcyclohexyl]biphenyl | 247/275 |

EXAMPLE 2

A mixture of 64.5% by weight of 4,4'-dipentylbicyclo[2.2.2]octane and 35.5% by weight of 1,2-bis[trans-4-pentylcyclohexyl]-ethane has a transition temperature of 168° C. between an $S_B$ phase and a I phase and can be utilized in the manner described in Example 1 for a thermal change in the friction moment.

EXAMPLE 3

A mixture of 42.2% by weight of 4'-hexyloxy-biphenyl-4-carbonitrile and 57.8% by weight of 4-(trans-4-octylcyclohexyl)-1-(2-cyanoethenyl)-benzene passes on cooling through the phase sequence N-$S_A$-N. In a mechanical component according to Example 1, a smaller friction moment is measured below 19° C. than above this temperature.

EXAMPLE 4

Figure 2:
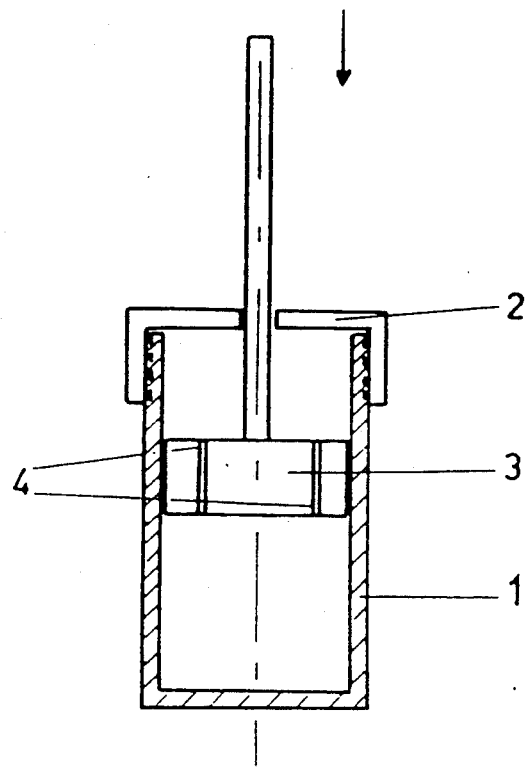
FIG. 2 is a schematic representation of a mechanical component of this invention which can function as a hydraulic damper.

A hydraulic damper, consisting of a cylinder (1), bounded at the top and bottom in the manner shown in FIG. 2 and having an internal diameter of 10 mm, and of a ring-shaped cover (2) screwed on and of an 8 mm long piston (3) which is guided along the cylinder wall and has two bores (4) of 0.5 mm diameter each, connecting the two cylinder spaces, is almost completely filled with the compound

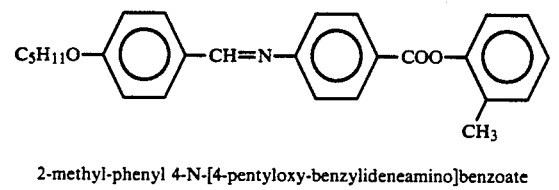

2-methyl-phenyl 4-N-[4-pentyloxy-benzylideneamino]benzoate which has a transition temperature of 53.5° C. from the $S_A$ phase to the isotropic phase, and placed into a water bath which holds the cylinder with its contents at a temperature of 51° C. In the position of the upper stop, the piston is moved with a total force of 2.0N, including the weight of the piston and of the guide rod. A time of 175 seconds is required for the piston stroke of 30 mm length. When the temperature of the arrangement is raised to 56° C., 4.2 seconds are measured.

The damping constants of the device accordingly have the following values:
$1.2 \times 10^4$ Ns/m at 51° C.
$2.8 \times 10^2$ Ns/m at 56° C.

EXAMPLE 5

Figure 3:
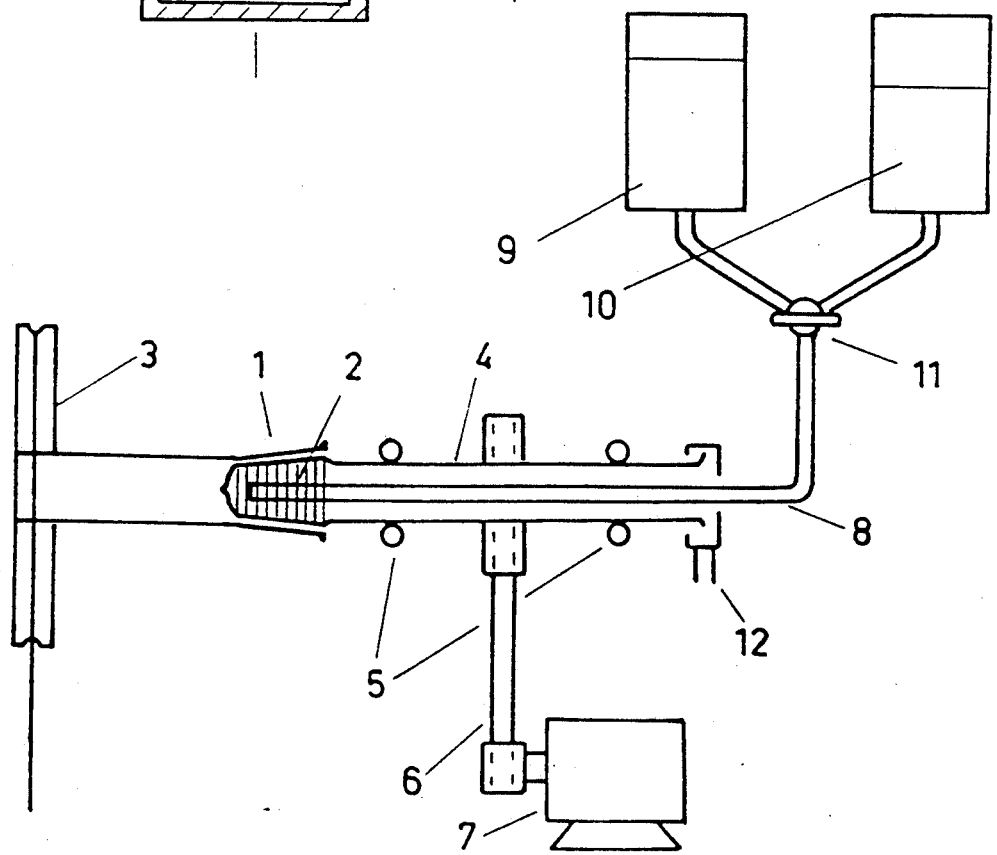
FIG. 3 is a schematic representation of a mechanical component of this invention which can function as a clutch.

A sleeve (1) with a conical ground joint and a ground core (2) fitting into it, both consisting of Duran glass (standard designation NS 29/32, DIN 12 249), are the essential parts of a clutch according to the invention (FIG. 3). The sleeve is rigidly joined to a lifting device (3) (not shown in more detail in FIG. 3), the rotating parts of which have a moment of inertia of $2.5 \times 10^{-4}$ kgm² and a torque, which is to be overcome, of 0.32 Nm. The core is part of a horizontally arranged hollow shaft (4), closed on one side, of 2 mm thick of Duran glass, which is guided in two bearings (5) and can be driven via a transmission belt (6) by a motor (6) of sufficient power. Before starting, the separate ground joint elements are heated with hot air to about 80° C., and 0.10 g of the compound

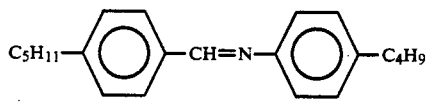

4-butyl-N-[4-pentylbenzylidene]aniline having a phase transition from smectic B to nematic at 24° C., is uniformly distributed over the surface of the core so that, when pushed into the sleeve by application of a small contact pressure (0.5 to 1N), an air bubble-free layer of the organic compound is formed. The motor is then switched on and the shaft is rotated at 10 Hz. The phase transition from nematic to smectic is induced by briefly feeding cooling water at a sufficient flow velocity through a lateral feeder (8) sketched in FIG. 3, from a reservoir (9) at a temperature which, for the purpose of rapid heat removal, is at least 6° C. below the transition temperature. The rotary motion of the lifting device at a frequency of 10 Hz takes place after a dead time of less than 10 seconds within an acceleration time of less than 5 seconds. Disengagement is effected by feeding water from a reservoir (10) at a temperature above the transition temperature, via a three-way valve (11). (12) is a collecting channel.

EXAMPLE 6

The arrangement of Example 5 is operated, in the manner described therein, with the compound

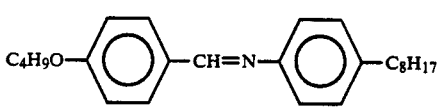

4-octyl-N-[4-butyloxybenzylidene]aniline which has a transition temperature of 49° C. from smectic B to smectic A. Here again, a selection is possible between engagement and idling by means of altering the fluid layer and an associated phase transition.

EXAMPLE 7

A radial bearing consists of a polished brass shaft (diameter 15 mm) and a temperature-controllable, undivided bearing shell of brass (load-bearing width 100 mm). The bearing clearance is 0.01 mm, and the load on the bearing during operation is 5.0N. A little lecithin is put onto the sliding surfaces and rubbed with wool to form a thin uniform layer. The warmed bearing is then embedded into a coherent layer of the compound

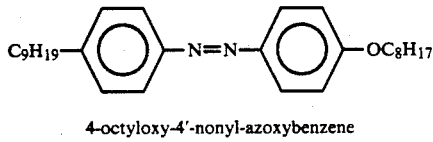

4-octyloxy-4'-nonyl-azoxybenzene having a transition from a smectic A phase to a nematic phase at 78° C. At a rotational frequency of 10 Hz and a temperature of the bearing of 73° C., a coefficient of friction $\mu$ of 0.15 results, and a $\mu$ of 0.007 is measured at 81° C. and the same rotational frequency. In the manner generally known, $\mu$ is determined by the torque which must be applied to maintain the motion at a defined rotational frequency.

EXAMPLE 8

The arrangement of example 5 is operated, in the manner described therein, with the compound

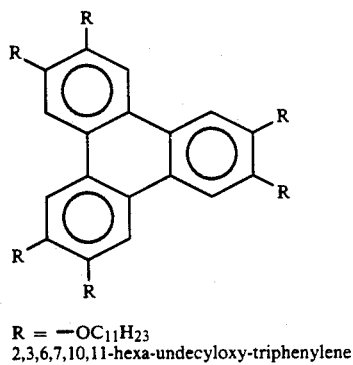

R = —OC$_{11}$H$_{23}$
2,3,6,7,10,11-hexa-undecyloxy-triphenylene which has a transition from a discoid-columnar phase to an isotropic phase at 66° C. Here again, a choice is possible between engagement and idling by changing the temperature of the fluid layer and by an associated phase transition.

EXAMPLE 9

A mechanical component (FIG. 1) with variable friction moment consists of a sheathed and a temperature-controllable Duran glass sleeve (1) with a ground joint and a shaft (2) guided for a length of 70 mm and having a diameter of 10 mm, likewise of Duran glass (produced by Schott Glaswerke, Mainz). The shaft is connected via a piece of thick-walled rubber hose (3) to a drive unit (not shown in FIG. 1) which is fitted with a measuring device which allows the energy dissipation attributable to the machine component to be measured as a function of the rotational frequency of the shaft. Before starting, the separate ground joint components are heated with hot air and coated with a sufficient quantity of 2,3,7,8,12,13-hexakis[decanoyloxy]truxene having a transition from discoid-nematic to columaric-discotic at 84° C., in such a way that, on assembly, a film free of air bubbles is formed on the entire friction surface. Paraffin oil at a temperature of 82° C. is passed through the shell, and the shaft is rotated at 1 Hz. The friction moment of the sliding device is found to be $3\times10^{-3} N \times m$. Paraffin oil at a temperature of 95° C. is then fed at a flow velocity of 5 ml$\times$s$^{-1}$. After 10 seconds, a friction moment of $9\times10^{-2} N \times m$ is measured. After the oil temperature has been lowered to 82° C., the original value of the friction moment is re-established.

EXAMPLE 10

Figure 4:
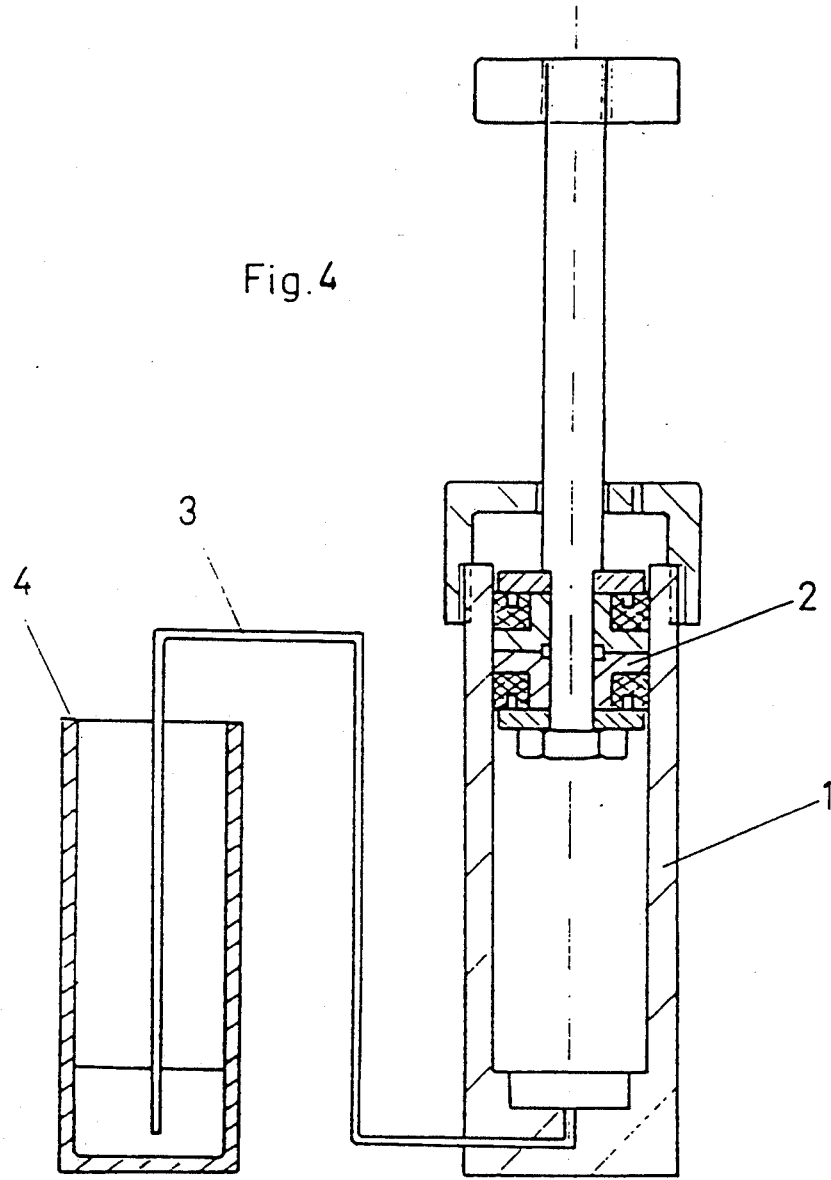
FIG. 4 is a schematic representation of a mechanical component of this invention which can function as a hydraulic damper.

A hydraulic damper (FIG. 4) for absorbing forces from two load ranges of widely different orders of magnitude consists of a steel cylinder (1) having an internal diameter of 28 mm, a hydraulic piston (2) mobile therein and having a sketched—generally known—sealing system, and a pipe (3) of 250 mm total length and 2.0 mm internal diameter, which extends from the piston space into an open container (4). A coherent, air bubble-free volume filled by the compound of the formula

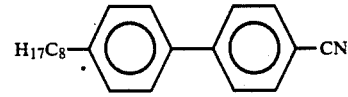

4'-octyl-biphenyl-4-carbonitrile is present in the piston space, pipe and stock container. This compound has a transition temperature of 32.5° C. between the smectic A phase and the nematic phase. The system, at 35° C., is then charged with a load of 12,000N (Newton). To cover a length of 65 mm, the piston takes 3.0 seconds. Under otherwise the same starting conditions, this time is 3.5 seconds when a load of only 185N is charged.

EXAMPLE 11

At normal pressure (1 bar), trans, trans-4-methoxy-4'-pentyl-bicyclohexyl has a transition temperature from $S_B$ to I of 29° C. In the arrangement shown in Example 10 and under the same conditions, a substantially higher damping constant than at normal pressure can be achieved with this compound at high pressures.

I claim:

1. Mechanical component consisting essentially of solid bodies which are mobile relative to one another under a variable frictional force and are separated from one another by a thermotropic liquid crystalline mass, characterized in that the change in frictional force is induced very rapidly by phase transitions between different thermotropic liquid-crystalline phases or between a thermotropic liquid-crystalline phase and an isotropic phase.

2. Mechanical component according to claim 1, characterized in that the phase transitions are induced by temperature changes in the thermotropic fluid crystalline mass.

3. Mechanical component according to claim 1, characterized in that the phase transitions are induced by pressure changes in the thermotropic fluid crystalline mass.

4. Mechanical component according to claim 1, characterized in that a transition between a smectic phase and a nematic phase is induced.

5. Mechanical component according to claim 1 characterized in that a transition between a smectic phase and the isotropic phase is induced.

6. Mechanical component according to claim 1, characterized in that a transition between one smectic phase and another smectic phase is induced.

7. Mechanical component according to claim 1, characterized in that a transition between a discoid-columnar phase and a discoid-nematic phase is induced.

8. Mechanical component according to claim 1, characterized in that a transition between a discoid-columnar phase and the isotropic phase is induced.

9. Mechanical component according to claim 1, characterized in that a transition between a phasmidic phase and the isotropic phase is induced.

10. Mechanical component according to claim 1, characterized in that the thermotropic liquid crystalline phase contains at least one compound of the formula I

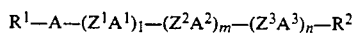

wherein $R^1$ and $R^2$ each are an unsubstituted or substituted alkyl group having 1 to 18 C atoms, in which one or two adjacent $CH_2$ groups can also be replaced by —O—, —CO—, —CHOH—, —CHCN—, —OOC—, —CO—, —CH=CH— and/or —C≡C— or a perfluoro alkyl group having 1 to 12 C atoms, in which one or two CF groups can also be replaced by —O—, —CHF—, —$CH_2$— and/or —CHOH— and/or a $CF_3$ group can be replaced by —$CF_2$H or —$CH_2$OH, and $R^2$ can also be H, F, CL, —CN or —COOH, A, $A^1$, $A^2$, $A^3$ each are 1,4-phenylene which is unsubstituted or mono- to di-substituted by CN groups or F or CL atoms and in which one or two CH groups can also be replaced by N atoms, 1,4-cyclohexylene in which one or two $CH_2$ groups can also be replaced by an O atom or CHF or $CF_2$ groups, and 1,4-bicyclo[2.2.2]octylene, $Z^1$, $Z^2$, $Z^3$ each are —$CH_2CH_2$—, —$CH_2O$—, —$OCH_2$—, —COO—, —OOC—, —$CH_2CF_2$—, —$CF_2CF_2$—, —CH=N—, —CH=CH—, —C≡C— or the single bond and l, m, n are each 0 or 1.

11. Mechanical component according to claim 10, characterized in that the thermotropic liquid crystalline mass contains a mixture of a plurality of compounds of the formula I.

12. Mechanical component according to claim 11, characterized in that the thermotropic liquid crystalline mass consists of a mixture, in which the total content of compounds of the formula I is at least 5 per cent by weight.

13. Mechanical component according to claim 1 characterized in that the thermotropic liquid crystalline mass contains at least one compound of the formula II

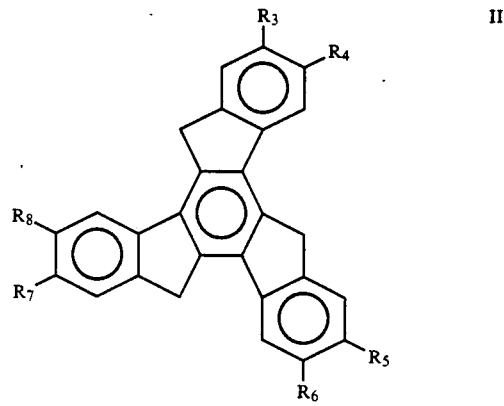

wherein $R_3$ to $R_8$ independently of one another are H, F, CL or a substituted or unsubstituted alkyl group having 1 to 18 C atoms, in which one or two nonadjacent $CH_2$ groups can also be replaced by —O—, —CO—, —COO— or —$CF_2$—.

14. A mechanical component according to claim 1 which is a hydraulic device.

15. A mechanical component according to claim 1 which is a brake.

16. A mechanical component according to claim 1 which is a clutch.

17. A mechanical component according to claim 1 which is a slide bearing.

* * * * *